US009041863B2

(12) United States Patent
Wang et al.

(10) Patent No.: US 9,041,863 B2
(45) Date of Patent: May 26, 2015

(54) ELECTRONIC DEVICE AND METHOD FOR DISPLAYING RESOURCES

(71) Applicant: Xiaomi Inc., Beijing (CN)

(72) Inventors: Chuan Wang, Beijing (CN); Xijie Shen, Beijing (CN); Zhaopeng Cheng, Beijing (CN); Yongjian Sun, Beijing (CN); Chuangqi Li, Beijing (CN); Jun Wan, Beijing (CN); Yi Ru, Beijing (CN); Feng Li, Beijing (CN); Xing Yan, Beijing (CN); Qingsong Dai, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/294,312

(22) Filed: Jun. 3, 2014

(65) Prior Publication Data

US 2015/0062433 A1    Mar. 5, 2015

Related U.S. Application Data

(63) Continuation of application No. PCT/CN2014/072227, filed on Feb. 19, 2014.

(30) Foreign Application Priority Data

Aug. 30, 2013  (CN) .......................... 2013 1 0389864

(51) Int. Cl.
*H04N 5/50*     (2006.01)
*H04N 5/268*    (2006.01)
(Continued)

(52) U.S. Cl.
CPC ................................. *H04N 5/44591* (2013.01)

(58) Field of Classification Search
USPC ......... 348/552–555, 705, 706, 569, 588, 584, 348/739; 725/131–134, 141–143, 151–153; 345/156; 715/781, 783, 788, 810, 843; 710/2, 8, 15–19, 300–302
See application file for complete search history.

(56) References Cited

U.S. PATENT DOCUMENTS 5,500,794 A * 3/1996 Fujita et al. ..................... 700/83
5,996,029 A * 11/1999 Sugiyama et al. .............. 710/15
(Continued)

FOREIGN PATENT DOCUMENTS

CN    20080067498    7/2008
CN    103092325      5/2013
(Continued)

OTHER PUBLICATIONS

International Search Report of corresponding PCT International Application No. PCT/CN2014/072227, from the State Intellectual Property Office of the P.R. China, dated Jul. 9, 2014.

*Primary Examiner* — Victor Kostak
(74) *Attorney, Agent, or Firm* — Finnegan, Henderson, Farabow, Garrett & Dunner LLP

(57) ABSTRACT

An electronic device, including: one or more hardware interfaces each for connecting to a signal source to receive at least one type of application resources; a control chip electrically connected to the one or more hardware interfaces, the control chip being configured to classify and integrate one or more types of application resources received through the one or more hardware interfaces, and generate a display signal for a main interface including a number of areas arranged according to a predetermined layout, wherein each area is configured to display information regarding a same type of the classified and integrated application resources, and different areas are configured to display information regarding different types of the classified and integrated application resources; and a display screen electrically connected to the control chip to display the main interface according to the display signal.

22 Claims, 8 Drawing Sheets

(51) Int. Cl.
    *G06F 11/30*     (2006.01)
    *G06F 13/38*     (2006.01)
    *H04N 5/445*     (2011.01)

(56) References Cited

U.S. PATENT DOCUMENTS

| | | | | |
|---|---|---|---|---|
| 6,122,018 | A * | 9/2000 | Sugihara et al. | 348/705 |
| 7,103,759 | B1 * | 9/2006 | Blixt | 712/248 |
| 7,945,701 | B2 * | 5/2011 | Dai | 710/2 |
| 8,176,214 | B2 * | 5/2012 | Jones et al. | 710/14 |
| 8,493,414 | B2 * | 7/2013 | Matsunobu | 345/650 |
| 2002/0174270 | A1 * | 11/2002 | Stecyk et al. | 710/1 |
| 2005/0262535 | A1 * | 11/2005 | Uchida et al. | 725/80 |
| 2006/0218309 | A1 * | 9/2006 | Young et al. | 710/8 |
| 2007/0083888 | A1 * | 4/2007 | Liebhold | 725/37 |
| 2007/0153132 | A1 * | 7/2007 | Jong | 348/705 |
| 2007/0291174 | A1 * | 12/2007 | Lee et al. | 348/564 |
| 2007/0300188 | A1 | 12/2007 | Kim | |
| 2008/0178085 | A1 * | 7/2008 | Miyazaki et al. | 715/716 |
| 2009/0193347 | A1 * | 7/2009 | Takahashi et al. | 715/763 |
| 2009/0282170 | A1 * | 11/2009 | Dai | 710/2 |
| 2011/0179450 | A1 * | 7/2011 | Kim et al. | 725/37 |
| 2011/0191810 | A1 * | 8/2011 | Thomas et al. | 725/81 |
| 2012/0092558 | A1 | 4/2012 | Fu et al. | |
| 2012/0099024 | A1 * | 4/2012 | Ryu et al. | 348/730 |
| 2012/0124615 | A1 * | 5/2012 | Lee | 725/30 |
| 2012/0131626 | A1 * | 5/2012 | Fernandez Gutierrez | 725/109 |
| 2012/0147271 | A1 * | 6/2012 | Choi et al. | 348/572 |
| 2013/0290886 | A1 * | 10/2013 | Chen et al. | 715/768 |
| 2013/0304795 | A1 * | 11/2013 | Kang et al. | 709/202 |

FOREIGN PATENT DOCUMENTS

| | | |
|---|---|---|
| CN | 202929609 | 5/2013 |
| CN | 103489432 | 1/2014 |
| JP | 3142768 | 3/2001 |

* cited by examiner

ELECTRONIC DEVICE AND METHOD FOR DISPLAYING RESOURCES

CROSS-REFERENCE TO RELATED APPLICATIONS

This application is a continuation of International Application No. PCT/CN2014/072227, filed Feb. 19, 2014, which claims priority from Chinese Patent Application No. 201310389864.2, filed Aug. 30, 2013, the entire contents of all of which are incorporated herein by reference.

TECHNICAL FIELD

The present disclosure generally relates to the field of electronic technology and, more particularly, to an electronic device and a method for displaying resources.

BACKGROUND

Televisions (TVs) have become increasingly intelligent and multifunctional owing to the development of the electronics and information technology. In a smart TV loaded with an operating system, in addition to an ordinary TV application provided for users to watch TV programs, auxiliary applications are also provided, e.g., for users to view micro blogs, check on weather, play games, browse webpages and the like. The smart TV may also expand or upgrade the auxiliary applications by downloading and installing third-party applications. Specifically, after turning on the smart TV, a user may directly watch TV programs and switch between channels with the smart TV just like with an ordinary TV. In addition to that, the user may select and enter one of the auxiliary applications through a menu on the smart TV.

Conventionally, the auxiliary applications are all provided through a menu on the smart TV, such that the user needs to go through many operation levels to reach certain auxiliary applications. As a result, the user may not know that the auxiliary applications are provided by the smart TV, or may not want to use the auxiliary applications even though the user knows that the auxiliary applications are provided, which results in low utilization rates of these auxiliary applications.

SUMMARY

According to a first aspect of the present disclosure, there is provided an electronic device, comprising: one or more hardware interfaces each for connecting to a signal source to receive at least one type of application resources; a control chip electrically connected to the one or more hardware interfaces, the control chip being configured to classify and integrate one or more types of application resources received through the one or more hardware interfaces, and generate a display signal for a main interface including a number of areas arranged according to a predetermined layout, wherein each area is configured to display information regarding a same type of the classified and integrated application resources, and different areas are configured to display information regarding different types of the classified and integrated application resources; and a display screen electrically connected to the control chip to display the main interface according to the display signal.

According to a second aspect of the present disclosure, there is provided a method for an electronic device to display resources, comprising: receiving one or more types of application resources through one or more hardware interfaces each for connecting to a signal source; classifying and integrating the one or more types of application resources received through the one or more hardware interfaces; generating a display signal for a main interface including a number of areas arranged according to a predetermined layout, wherein each area is configured to display information regarding a same type of the classified and integrated application resources, and different card-shaped areas are configured to display information regarding different types of the classified and integrated application resources; and displaying the main interface according to the display signal.

According to a third aspect of the present disclosure, there is provided a non-transitory computer-readable medium having stored therein instructions that, when executed by a processor of a device, causes the device to perform a method to display resources, the method comprising: receiving one or more types of application resources through one or more hardware interfaces each for connecting to a signal source; classifying and integrating the one or more types of application resources received through the one or more hardware interfaces; generating a display signal for a main interface including a number of areas arranged according to a predetermined layout, wherein each area is configured to display information regarding a same type of the classified and integrated application resources, and different card-shaped areas are configured to display information regarding different types of the classified and integrated application resources; and displaying the main interface according to the display signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
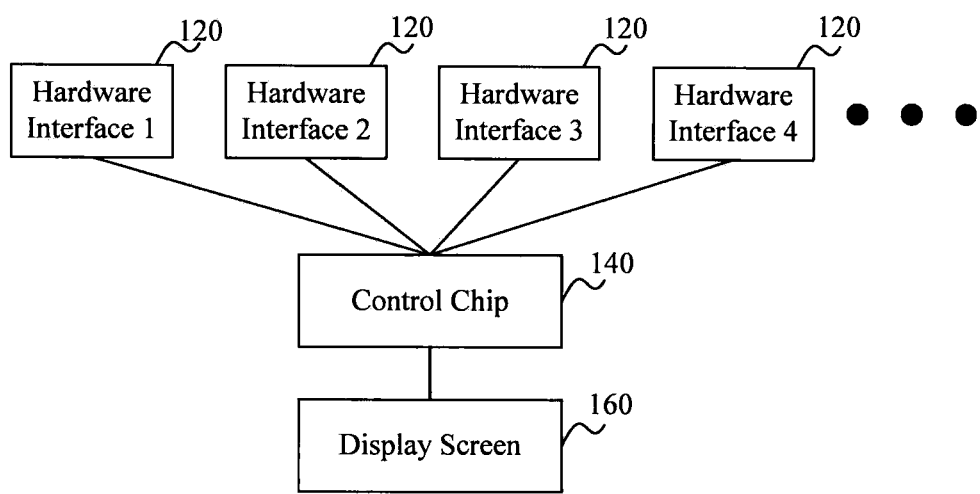
FIG. 1 is a schematic diagram of an electronic device, according to an exemplary embodiment.

FIG. 1 illustrates a schematic diagram of an electronic device 100, according to an exemplary embodiment. For example, the electronic device 100 may be a TV, a display, an all-in-one machine, a display platform and the like. Referring to FIG. 1, the electronic device 100 includes one or more hardware interfaces 120, a control chip 140 electrically connected to the one or more hardware interfaces 120, and a display screen 160 electrically connected to the control chip 140. FIG. 1 shows four hardware interfaces 120 for illustrative purposes only.

In exemplary embodiments, each of the one or more hardware interfaces 120 is configured to connect to a same signal source or different signal sources to receive at least one type of application resources. The control chip 140 is configured to classify and integrate one or more types of application resources received through the one or more hardware interfaces 120, and generate a display signal for a main interface including a number of areas, e.g., card-shaped areas, arranged according to a predetermined layout. Each card-shaped area is configured to display information regarding a same type of the classified and integrated application resources, and different card-shaped areas are configured to display information regarding different types of the classified and integrated application resources. The display screen 160 is configured to display the main interface according to the display signal.

In the illustrated embodiment, the electronic device 100 displays various types of application resources received through different hardware interfaces by classifying and integrating them into different card-shaped areas of the main interface. As a result, operation levels for using different applications in different card-shaped areas are similar or the same, which facilitates utilization of respective types of application resources.

Figure 2A:
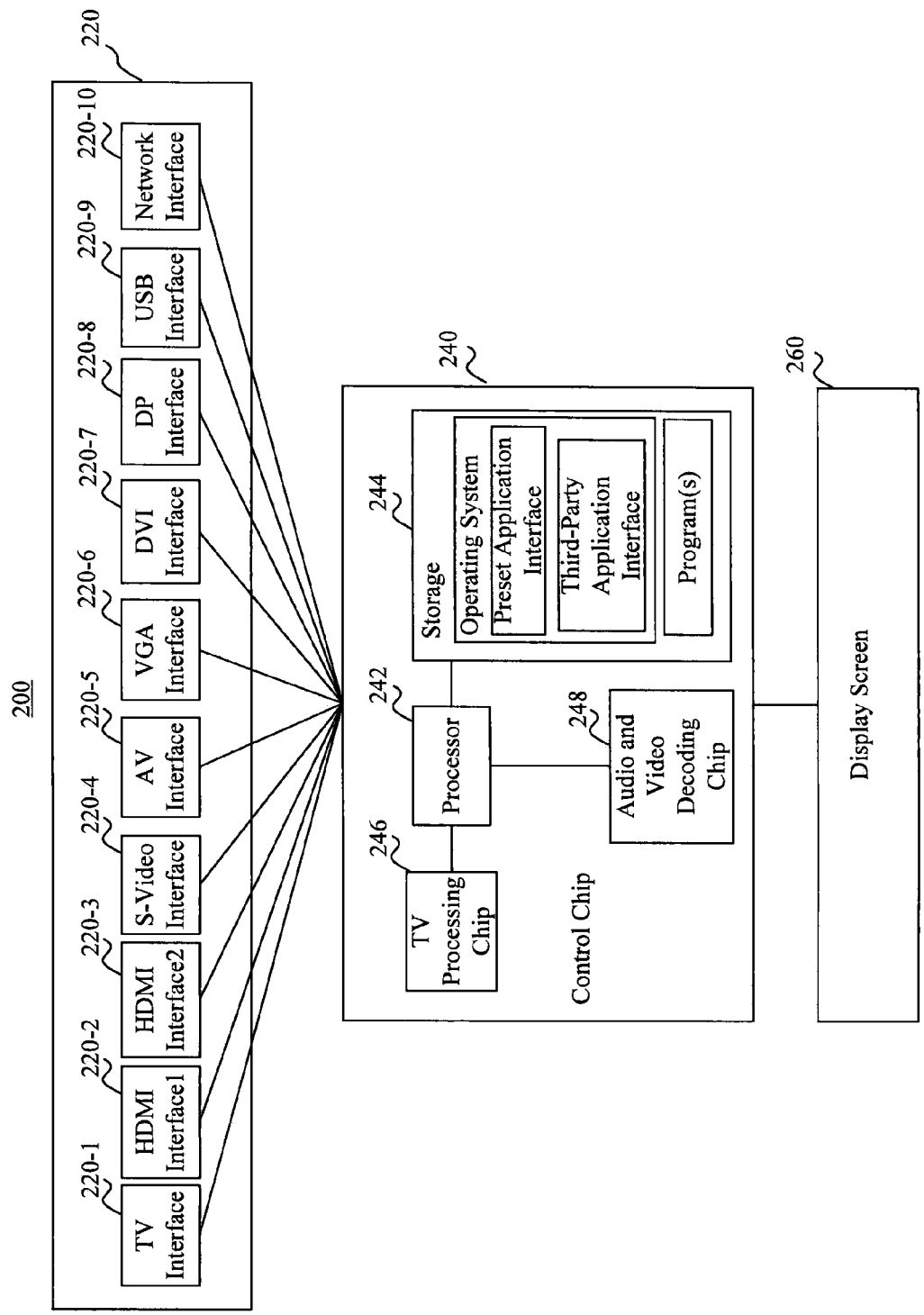
FIG. 2A is a schematic diagram of an electronic device, according to an exemplary embodiment.

FIG. 2A illustrates a schematic diagram of an electronic device 200, according to an exemplary embodiment. For example, the electronic device 200 is a smart TV. Referring to FIG. 2A, the electronic device 200 includes one or more hardware interface 220, a control chip 240 electrically connected to the one or more hardware interfaces 220, and a display screen 260 electrically connected to the control chip 240.

In exemplary embodiments, each of the one or more hardware interfaces 220 is configured to connect to a same signal source or different signal sources to receive at least one type of application resources. For example, the hardware interface 220 may include one or more of a TV interface 220-1, a high definition multimedia interface (HDMI) interface, such as a first HDMI interface 220-2 and a second HDMI interface 220-3, an S-Video interface 220-4, an audio and video (AV) interface 220-5, a video graphics array (VGA) interface 220-6, a digital visual interface (DVI) 220-7, a display port (DP) interface 220-8, a universal serial bus (USB) interface 220-9, or a network interface 220-10. The network interface 220-10 may include at least one of a wireless fidelity (Wi-Fi) wireless network interface, a 3rd generation partnership project (3GPP) network interface, an Ethernet wired network interface, or an optical network interface. In the illustrated embodiment, because the electronic device 200 is a smart TV, the hardware interfaces 220 may include a number of other hardware interfaces in addition to the TV interface 220-1 and the network interface 220-10, and each type of the hardware interfaces 220 may include more than one interface. For example, the electrical device 200 may have the first and second HDMI interfaces 220-2 and 220-3, respectively.

In exemplary embodiments, the signal source connected with the TV interface 220-1 is a TV cable that provides TV application resources, such as TV programs, to the electronic device 200 through the TV interface 220-1.

In exemplary embodiments, the signal sources connected with the HDMI interfaces 220-2 and 220-3, the S-Video interface 220-4, the AV interface 220-5, the VGA interface 220-6, the DVI interface 220-7, and the DP interface 220-8 may each be one of a high-definition player, a jukebox, a set-top box, a DVD/VCD player, a computer, a tablet computer, and a game console. These signal sources provide local playback resources, such as high-definition movies and music resources.

In exemplary embodiments, the signal source connected with the USB interface 220-9 may be a U disk, or one of a high-definition player, a jukebox, a set-top box, a DVD/VCD player, a computer, a tablet computer, or a game console. These signal sources provide local playback resources.

In exemplary embodiments, the signal source connected with the network interface 220-10 is one or more remote servers that provide at least one type of the following application resources: online movie and video application resources, game application resources, theme application resources, picture application resources, music application resources, system application resources, customized application resources running through a preset application interface, and third-party application resources running through a preset third-party application interface.

Accordingly, in the above illustrated embodiments, the types of application resources include at least one of the TV application resources, the local playback application resources, the online movie and video application resources, the game application resources, the theme application resources, the picture application resources, the music application resources, the system application resources, the customized application resources running through the preset application interface, and the third-party application resources running through the preset third-party application interface.

In exemplary embodiments, the control chip 240 includes a processor 242 and a storage 244, and may also include one or more auxiliary chips, such as a TV processing chip 246 or an audio and video decoding chip 248. The storage 244 stores an operating system and one or more programs therein. The operating system provides a preset application interface for customized application resources and a third-party application interface for third-party application resources.

In exemplary embodiments, the control chip 240 is configured to classify and integrate one or more types of application resources received through the one or more hardware interfaces 220. Depending on different hardware interfaces included in the electronic device 200, the application resources are classified and integrated as follows.

In one exemplary embodiment, the hardware interfaces 220 include the TV interface 220-1. Accordingly, the control chip 240 is configured to classify application resources received through the TV interface 220-1 into one type of application resources. For example, the control chip 240 classifies TV programs received through the TV interface 220-1 into one type of application resources.

In one exemplary embodiment, the hardware interfaces 220 include one or more interface of the HDMI interfaces 220-2 and 220-3, the S-Video interface 220-4, the AV interface 220-5, the VGA interface 220-6, the DVI interface 220-

7, the DP interface 220-8, or the USB interface 220-9. Accordingly, the control chip 240 is configured to classify application resources received through the one or more interfaces into one or more types of application resources, respectively, or classify the application resources all into one type of application resources. For example, the control chip 240 classifies different local playback application resources received through the at least one interface into one type of application resources.

In one exemplary embodiment, the hardware interfaces 220 include the network interface 220-10. Accordingly, the control chip 240 is configured to classify application resources received through the network interface 220-10 into at least one type of application resources on the basis of application type. For example, the control chip 240 classifies the game application resources into one type of application resources, classifies the theme application resources into one type of application resources, and classifies the system application resources, the customized application resources running through the preset application interface, and the third-party application resources running through the preset third-party application interface into one type of application resources.

In exemplary embodiments, the control chip 240 is also configured to generate a display signal for a main interface including a number of areas, e.g., card-shaped areas, arranged according to a predetermined layout. Each card-shaped area is configured to display information regarding a same type of the classified and integrated application resources, and different card-shaped areas are configured to display information regarding different types of the classified and integrated application resources.

Figure 2B:
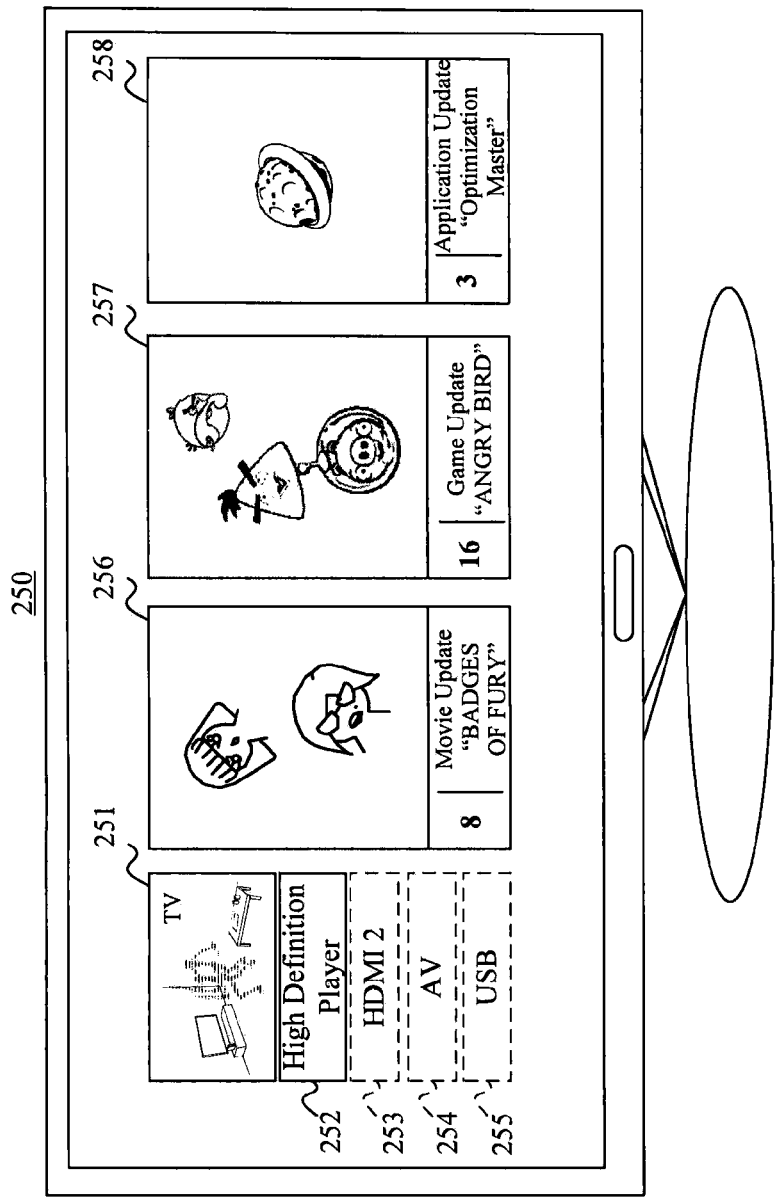
FIG. 2B is a schematic of a main interface displayed on the electronic device shown in FIG. 2A, according to an exemplary embodiment.

FIG. 2B is a schematic diagram of a main interface 250, according to an exemplary embodiment. Referring to FIG. 2B, the main interface 250 includes, e.g., eight card-shaped areas 251, 252, . . . , and 258 aligned in row or in a column. The five card-shaped areas 251, 252, . . . and 255 are arranged on the left of the main interface 250 and aligned in column, and the remaining three card-shaped areas 256, 257, and 258 are arranged in a row on the main interface 250, with the top of each of the three card-shaped areas 256, 257, and 258 aligned with the top of the card-shaped area 251. Also referring to FIG. 2A, in the illustrated embodiment, the card-shaped area 251 is configured to display information regarding the TV application resources received through the TV interface 220-1, the card-shaped area 252 is configured to display information regarding the local playback application resources received through the first HDMI interface 220-2, the card-shaped area 253 is configured to display information regarding the local playback application resources received through the second HDMI interface 220-3, the card-shaped area 254 is configured to display information regarding the local playback application resources received through the AV interface 220-5, the card-shaped area 255 is configured to display information regarding the local playback application resources received through the USB interface 220-9, the card-shaped area 256 is configured to display information regarding the online movie and video application resources received through the network interface 220-10, the card-shaped area 257 is configured to display information regarding the game application resources received through the network interface 220-10, and the card-shaped area 258 is configured to display information regarding the system application resources, the customized application resources running through the preset application interface, and the third-party application resources running through the preset third-party application interface received through the network interface 220-10.

In exemplary embodiments, when a first one of the hardware interfaces 220 receives a first application resource from a first signal source, the control chip 240 is configured to determine information to be displayed in a corresponding one of the card-shaped area according to the first application resource. The information to be displayed includes at least one of poster pictures, contents, introduction information, and updated information of the first application resource. In one exemplary embodiment, the hardware interfaces 220 include the TV interface 220-1 connected to a TV cable to receive a TV application resource to which the card-shaped area 251 corresponds. Accordingly, the control chip 240 determines that the information to be displayed in the card-shaped area 251 includes the contents of the TV application resource, e.g., real time TV pictures. In another embodiment, the hardware interfaces 220 include the network interface 220-10 connected to a remote server to receive an online movie and video application resource to which the card-shaped area 256 corresponds. Accordingly, the control chip 240 determines that the information to be displayed in the card-shaped area 256 includes the poster pictures, the introduction information "BADGES OF FURY," and the updated information "8" of the online movie and video application resource.

In exemplary embodiments, when the first one of the hardware interfaces 220 is connected to the first signal source but fails to receive any application resources from the first signal source, the control chip 204 is configured to determine information to be displayed in the corresponding one of the card-shaped areas according to the first signal source. The information to be displayed includes at least one of a connection status of the first signal source, descriptive information of the first signal source, a device type of the first signal source, a device name of the first signal source, or an operating status of the first signal source. For example, when the first HDMI interface 220-2 is connected to a high definition player, but there are no application resources output from the high definition player, the control chip 240 sets a transparency of the card-shaped area 252 to be, e.g., zero, to indicate the connection status between the first HDMI interface 220-2 and the high definition player, and displays a device name of the high definition player in the card-shaped area 252.

In exemplary embodiments, when a first one of the hardware interfaces 220 is not connected to a signal source, the control chip 204 is configured to determine information to be displayed in a corresponding one of the card-shaped areas according to the first hardware interface. The information to be displayed includes at least one of an interface type or an unconnected status of the first hardware interface. For example, when the second HDMI interface 220-2 is not connected to a signal source, the control chip 240 sets a transparency of the card-shaped area 253 to be, e.g., 70%, represented by dotted lines in FIG. 2B, to indicate that the second HDMI interface 220-3 is in the unconnected status, and displays the interface type of the second HDMI interface 220-3 in the card-shaped area 253.

In exemplary embodiments, the display screen 260 is configured to display the main interface, such as the main interface (FIG. 2B), according to the display signal from the control chip 240.

In one exemplary embodiment, the control chip 240 is also configured to receive a selection signal selecting one of the card-shaped areas in the main interface, and generate a second display signal according to the application resources corresponding to the selected card-shaped area. Accordingly, the display screen 260 is configured to switch from displaying the main interface to displaying sub-level contents corresponding to the selected card-shaped area, according to the second display signal. The sub-level contents include contents of the application resources corresponding to the selected card-shaped area, a list of those application resources, or detailed information of the signal source corresponding to the selected card-shaped area.

Figure 2C:
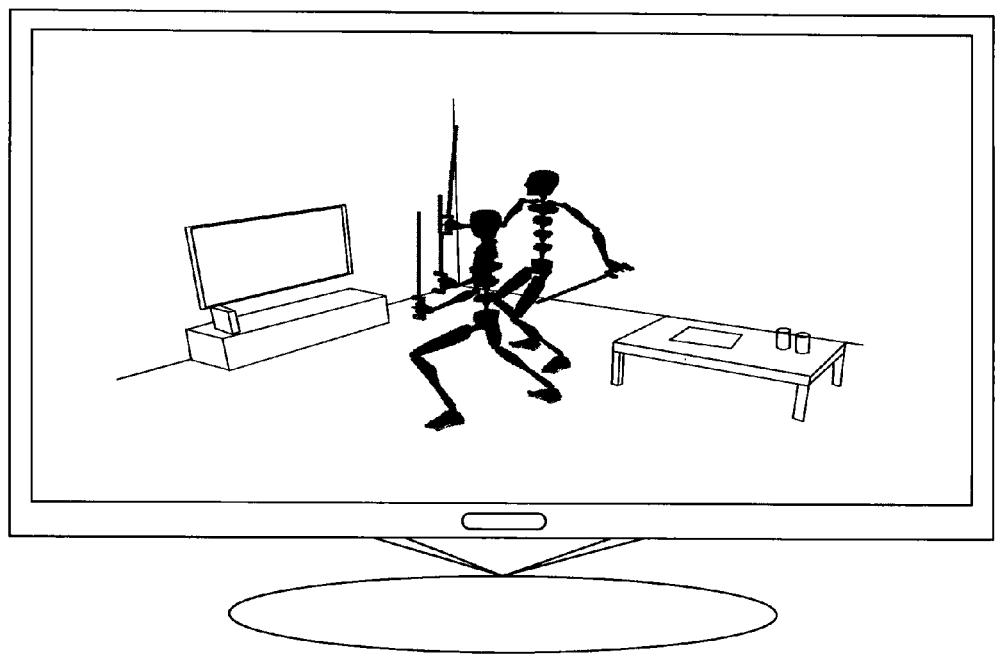
FIG. 2C is a schematic diagram of sub-level contents displayed on the electronic device shown in FIG. 2A, according to an exemplary embodiment.

In one exemplary embodiment, the card-shaped area 251 is configured to display information regarding one TV application resource received through the TV interface 220-1. Accordingly, after the control chip 240 receives a selection signal selecting the card-shaped area 251, the display screen 260 directly displays the TV application resource according to the second display signal generated by the control chip 240, as shown in FIG. 2C. In one exemplary embodiment, the card-shaped area 256 is configured to display information regarding a plurality of online movie and video application resources received through the network interface 220-10. Accordingly, after the control chip 240 receives a selection signal selecting the card-shaped area 256, the display screen 260 displays a list of the online movie and video application resources according to the second display signal generated by the control chip 240. In one exemplary embodiment, the card-shaped area 255 is configured to display information regarding a plurality of local playback application resources received through the USB interface 220-9. Accordingly, after the control chip 240 receives a selection signal selecting the card-shaped area 255, the display screen 260 displays a list of documents in, e.g., a U disk, according to the second display signal generated by the control chip 240.

In exemplary embodiments, the control chip 240 is further configured to receive a return signal corresponding to the sub-level contents, the return signal including instructions for the display screen 260 to return to the main interface. According to the return signal, the control chip 240 generates again a display signal for the main interface including the number of card-shaped areas arranged according to the predetermined layout. Accordingly, the display screen 260 is configured to switch from displaying the sub-level contents to displaying the main interface according to the display signal.

In one exemplary embodiment, the display screen 260 currently displays the sub-level contents regarding the TV application resources. Accordingly, when the control chip 240 receives the return signal, the controller chip 240 generates the display signal for the main interface including the number of card-shaped areas arranged according to the predetermined layout, according to the return signal. The display screen 260 switches from displaying the sub-level contents to displaying the main interface, such as the main interface 250 (FIG. 2B), according to the display signal.

In exemplary embodiments, the main interface displays all of the number of card-shaped areas in more than one page. Accordingly, the control chip 240 is configured to receive a replace signal corresponding to the main interface and, according to the replace signal, generate a third display signal for the main interface to replace all or a part of the currently displayed card-shaped areas with other card-shaped areas. The display screen 260 is further configured to display the main interface including the other card-shaped areas according to the third display signal.

Figure 2D:
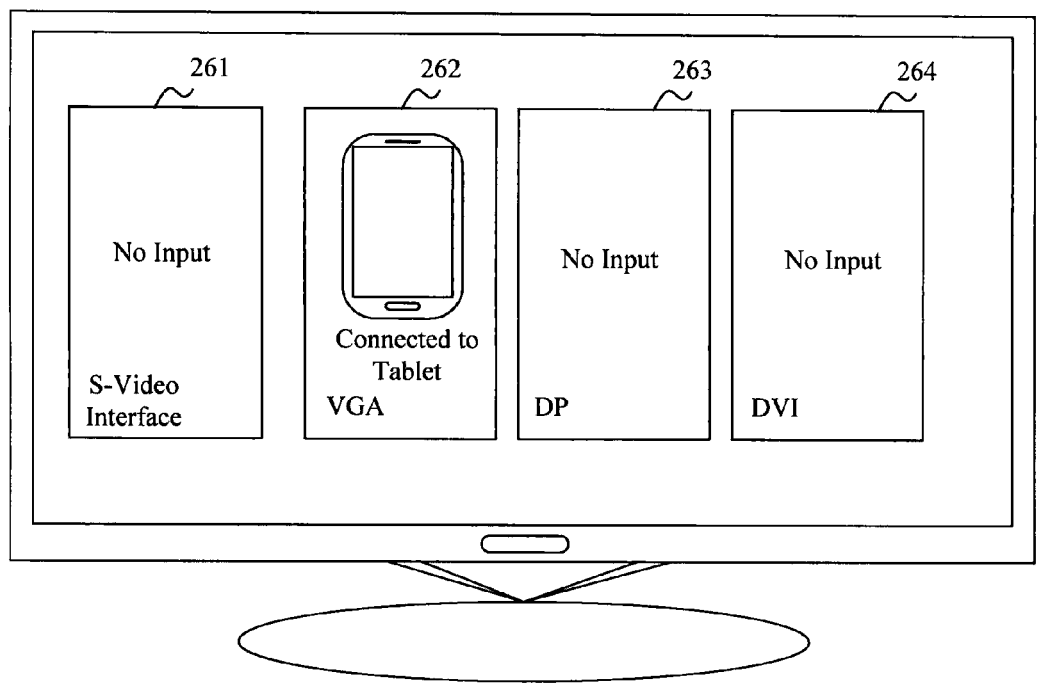
FIG. 2D is a schematic diagram of a replaced main interface displayed on the electronic device shown in FIG. 2A, according to an exemplary embodiment.
Figure 2E:
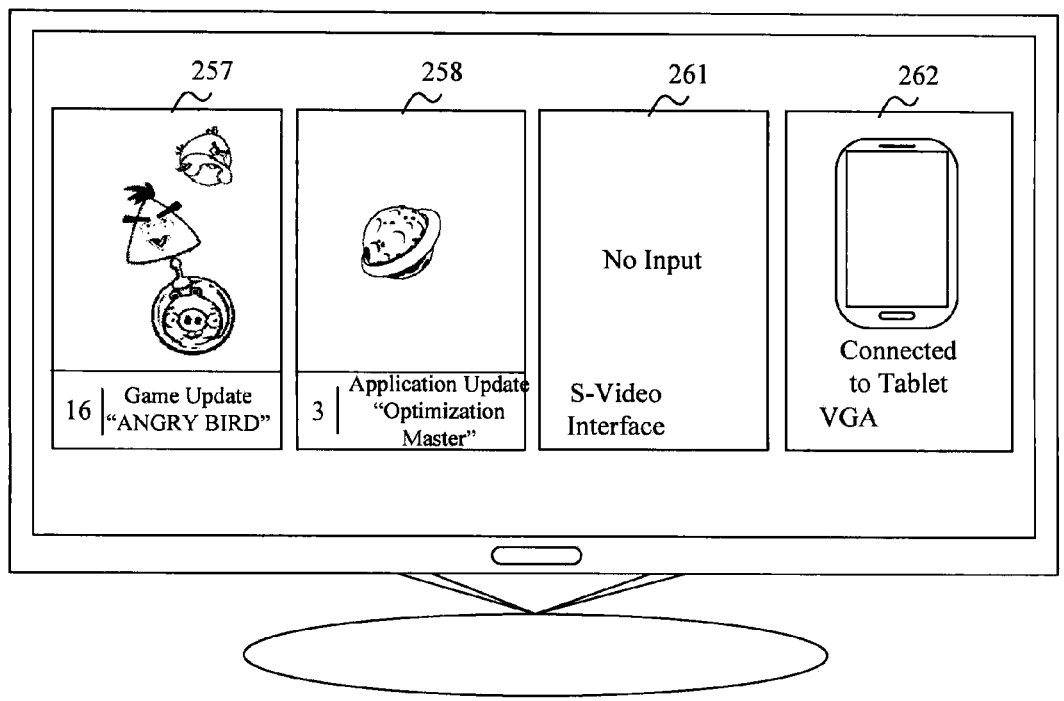
FIG. 2E is a schematic diagram of a replaced main interface displayed on the electronic device shown in FIG. 2A, according to an exemplary embodiment.

In one exemplary embodiment, the control chip 240 receives a page flip signal generated from a flip page operation, as the replace signal. Accordingly, the control chip 240 generates the third display signal according to the page flip signal, and the display screen 260 displays the main interface including card-shaped areas 261, 262, 263, and 264, which replace all of the currently displayed card-shaped areas 251 through 258, as shown in FIG. 2D. In one exemplary embodiment, the control chip 240 receives a slide signal generated from an operation of sliding a finger over the display screen 260, as the replace signal. Accordingly, the control chip 240 generates the third display signal according to the slide signal, and the display screen 260 displays the main interface including the card-shaped areas 261 and 262, which replace a part of the currently displayed card-shaped areas 251 through 256 according to the third display signal, as shown in FIG. 2E.

In the illustrated embodiments, the electronic device 200 displays various types of application resources received through different hardware interfaces by classifying and integrating them into different card-shaped areas of the main interface. As a result, operation levels for using different applications in different card-shaped areas are similar or the same, which facilitates utilization of respective types of application resources.

Moreover, the electronic device 200 displays sub-level contents of a card-shaped area in the main interface after the card-shaped area is selected, and returns to the main interface including the number of card-shaped areas when receiving a return signal. As a result, the application resources of each card-shaped area have similar chances to be selected by the user, which facilitates utilization of each type of the application resources.

Figure 3:
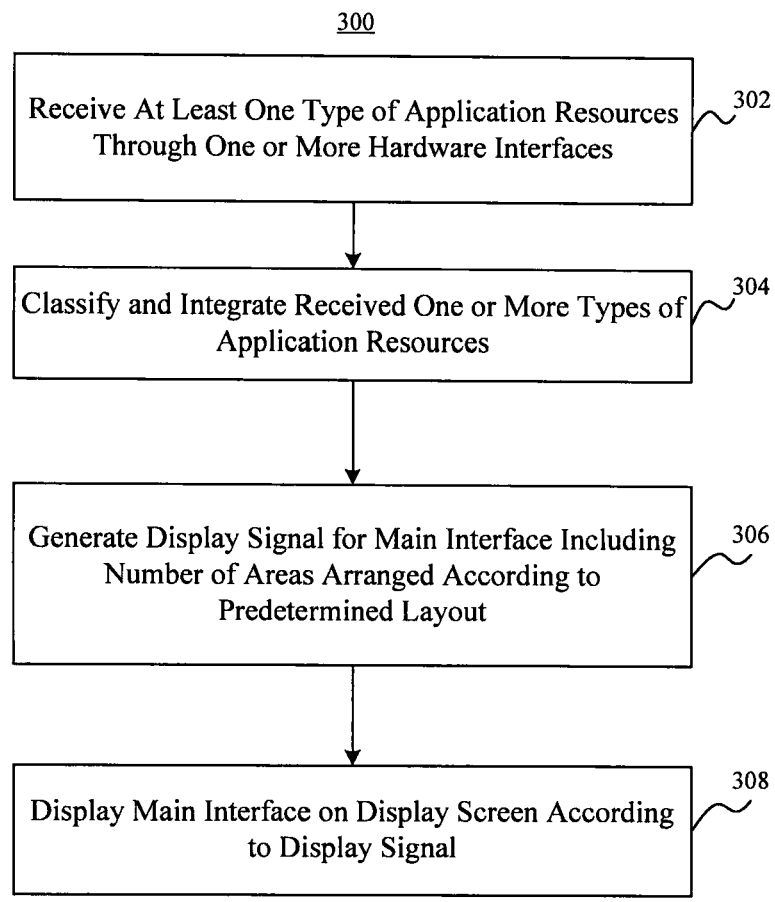
FIG. 3 is a flowchart of a method for displaying resources, according to an exemplary embodiment.

FIG. 3 illustrates a flowchart of a method 300 for an electronic device to display resources, accordingly to an exemplary embodiment. For example, the electronic device may be the electronic device 100 (FIG. 1) or 200 (FIG. 2A). The electronic device includes one or more hardware interfaces each for connecting to a same signal source or different signal sources to receive one or more types of application resources. Referring to FIG. 3, the method 300 includes the following steps.

In step 302, the electronic device receives one or more types of application resources through the one or more hardware interfaces.

In step 304, the electronic device classifies and integrates the received one or more types of application resources.

In step 306, the electronic device generates a display signal for a main interface including a number of areas, e.g., card-shaped areas, arranged according to a predetermined layout. Each of the card-shaped areas is configured to display information regarding a same type of the classified and integrated application resources, and different card-shaped areas are configured to display information regarding different types of the classified and integrated application resources.

In step 308, the electronic device displays the main interface on its display screen according to the display signal.

Figure 4:
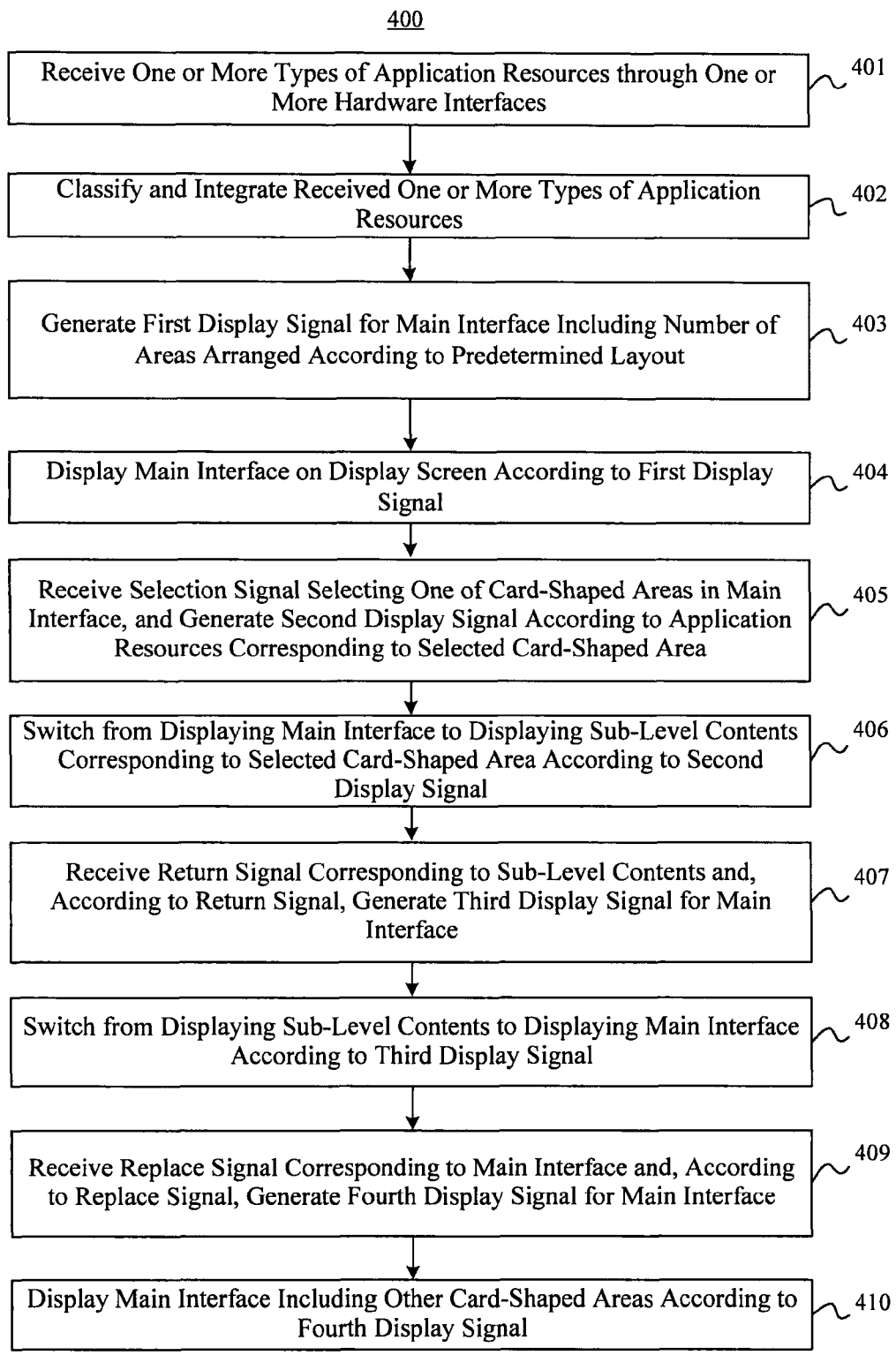
FIG. 4 is a flowchart of a method for displaying resources, according to an exemplary embodiment.

FIG. 4 illustrates a flowchart of a method 400 for an electronic device to display resources, according to an exemplary embodiment. For example, the electronic device may be the electronic device 100 (FIG. 1) or 200 (FIG. 2A). The electronic device includes a control chip, a display screen, and one or more hardware interfaces each for connecting to a same signal source or different signal sources to receive one or more types of application resources. The signal source may be a TV cable, a high-definition player, a jukebox, a set-top box, a DVD/VCD, a computer, a tablet computer, a U disk, a game console, a remote server, etc. Referring to FIG. 4, the method 400 includes the following steps.

In step 401, the electronic device receives one or more types of application resources through the one or more hardware interfaces. For example. the hardware interfaces may include one or more of a TV interface, an HDMI interface, an S-Video interface, an AV interface, a VGA interface, a DVI interface, a DP interface, a USB interface, or a network interface. The network interface includes at least one of a WIFI wireless network interface, a 3GPP network interface, an Ethernet wired network interface and an optical network interface.

In step 402, the electronic device classifies and integrates the received one or more types of application resources by the control chip.

In one exemplary embodiment, the hardware interfaces include the TV interface. Accordingly, the electronic device classifies application resources received through the TV interface into one type of application resources by the control chip.

In one exemplary embodiment, the hardware interfaces include one or more interfaces of the HDMI interface, the S-Video interface, the AV interface, the VGA interface, the DVI interface, the DP interface, or the USB interface. Accordingly, the electronic device, by the control chip, classifies application resources received through the one or more interfaces into one or more types of application resources, respectively, or classifies the application resources all into one type of application resources.

In one exemplary embodiment, the hardware interfaces include the network interface. Accordingly, the electronic device classifies, by the control chip, application resources received through the network interface into at least one type of application resources on the basis of application type.

The types of application resources include at least one type of TV application resources, local playback application resources, online movie and video application resources, game application resources, theme application resources, picture application resources, music application resources, system application resources, customized application resources running through a preset application interface, and third-party application resources running through a preset third-party application interface.

In step 403, the electronic device generates a first display signal for a main interface including a number of areas, e.g., card-shaped areas, arranged according to a predetermined layout by the control chip. Each card-shaped area is configured to display information regarding a same type of the classified and integrated application resources, and different card-shaped areas are configured to display information regarding different types of the classified and integrated application resources.

In exemplary embodiments, when a first one of the hardware interfaces receives a first application resource from a first signal source, the electronic device determines, by the control chip, information to be displayed in a corresponding one of the card-shaped areas according to the first application resource. The information to be displayed includes at least one of poster pictures, contents, introduction information, and updated information of the first application resource.

In exemplary embodiments, when the first one of the hardware interfaces is connected to the first signal source but fails to receive any application resource from the first signal source, the electronic device determines, by its control chip, information to be displayed in the corresponding one of the card-shaped areas according to the first signal source. The information to be displayed includes at least one of a connection status of the first signal source, descriptive information of the first signal source, a device type of the first signal source, a device name of the first signal source, or an operating status of first the signal source.

In exemplary embodiments, when a first one of the hardware interfaces is not connected to a signal source, the electronic device determines, by the control chip, information to be displayed in a corresponding one of the card-shaped areas according to the first hardware interface. The information to be displayed includes at least one of an interface type or an unconnected status of the first hardware interface.

In step 404, the electronic device displays the main interface on the display screen according to the first display signal.

In step 405, the electronic device receives a selection signal selecting one of the card-shaped areas in the main interface, and generates a second display signal according to the application resources corresponding to the selected card-shaped area by the control chip.

In step 406, the electronic device switches from displaying the main interface to displaying sub-level contents corresponding to the selected card-shaped area according to the second display signal. The sub-level contents include contents of the application resources corresponding to the selected card-shaped area, a list of those application resources, and detailed information of the signal source corresponding to the selected card-shaped area.

In step 407, the electronic device receives a return signal corresponding to the sub-level contents and, according to the return signal, generates a third display signal for the main interface including the number of card-shaped areas arranged according to the predetermined layout, by the control chip.

In step 408, the electronic device switches from displaying the sub-level contents to displaying the main interface according to the third display signal.

In the illustrated embodiment, the main interface displays more than one page of card-shaped areas. Accordingly, in step 409, the electronic device receives a replace signal corresponding to the main interface and, according to the replace signal, generates a fourth display signal for the main interface to replace all or a part of the currently displayed card-shaped areas with other card-shaped areas, by the control chip. The replace signal may be a page flip signal or a slide signal.

In step 410, the electronic device displays on the display screen the main interface including the other card-shaped areas according to the fourth display signal.

In the illustrated embodiment, step 409 and step 410 are performed right after step 408. It should be noted that step 409 and step 410 may also be performed right after step 404.

It should be understood by those skilled in the art that, all or part of the steps of the above embodiments may be implemented through hardware, software, a combination thereof. The software may be stored on a computer-readable storage medium, such as a read-only memory, magnetic or optical disks.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An electronic device, comprising:
   one or more hardware interfaces each for connecting to a signal source to receive at least one type of application resources;

a control chip electrically connected to the one or more hardware interfaces, the control chip being configured to classify and integrate one or more types of application resources received through the one or more hardware interfaces, and generate a display signal for a main interface including a number of areas arranged according to a predetermined layout, wherein each area is configured to display information regarding a same type of the classified and integrated application resources, different areas are configured to display information regarding different types of the classified and integrated application resources, and at least one area corresponds to a hardware interface receiving no application resource; and a display screen electrically connected to the control chip to display the main interface according to the display signal.

2. The electronic device according to claim 1, wherein the one or more hardware interfaces include a TV interface, and the control chip is configured to classify application resources received through the TV interface into one type of application resources.

3. The electronic device according to claim 1, wherein the one or more hardware interfaces include one or more interfaces of an HDMI interface, an S-Video interface, an AV interface, a VGA interface, a DVI interface, a DP interface, and a USB interface, and the control chip is configured to classify application resources received through the one or more interfaces into one or more types of application resources, respectively, or classify the received application resources all into one type of application resources.

4. The electronic device according to claim 1, wherein the one or more hardware interfaces include a network interface, and the control chip is configured to classify application resources received through the network interface into one or more types of application resources based on an application type of the received application resources.

5. The electronic device according to claim 1 wherein the control chip is configured to classify and integrate the received one or more types of application resources into at least one type of TV application resources, local playback application resources, online movie and video application resources, game application resources, theme application resources, picture application resources, music application resources, system application resources, customized application resources running through a preset application interface, third-party application resources running through a preset third-party application interface.

6. The electronic device according to claim 1, wherein the control chip is configured, when a first one of the one or more hardware interfaces receives a first application resource from a first signal source, to determine information to be displayed in a corresponding one of the areas according to the first application resource, the information to be displayed including at least one of poster pictures, contents, introduction information, or updated information of the first application resource.

7. The electronic device according to claim 1, wherein the control chip is configured, when a first one of the one or more hardware interfaces is connected to a first signal source but fails to receive any application resource from the first signal source, to determine information to be displayed in a corresponding one of the areas according to the first signal source, the information to be displayed including at least one of a connection status of the first signal source, descriptive information of the first signal source, a device type of the first signal source, a device name of the first signal source, or an operating status of the first signal source.

8. The electronic device according to claim 1, wherein the control chip is configured, when a first one of the one or more hardware interfaces is not connected to any signal source, to determine information to be displayed in a corresponding one of the areas according to the first one of the hardware interfaces, the information to be displayed including at least one of an interface type or an unconnected status of the first one of the hardware interfaces.

9. The electronic device according to claim 1, wherein the display signal is a first display signal;

the control chip is further configured to receive a selection signal selecting one of the areas in the main interface, and generate a second display signal according to the application resources corresponding to the selected area; and the display screen is configured to switch from displaying the main interface to displaying sub-level contents corresponding to the selected area according to the second display signal, the sub-level contents including contents of the application resources corresponding to the selected area, a list of those application resources, and detailed information of a signal source corresponding to the selected area.

10. The electronic device according to claim 9, wherein the control chip is further configured to receive a return signal corresponding to the sub-level contents and, according to the return signal, generate a third display signal for the main interface including the number of areas arranged according to the predetermined layout; and the display screen is further configured to switch from displaying the sub-level contents to displaying the main interface according to the third display signal.

11. The electronic device according to claim 1, wherein the display signal is a first display signal;

the control chip is further configured, when the main interface includes more than one page of areas, to receive a replace signal corresponding to the main interface, and generate a second display signal for the main interface to replace all or a part of currently displayed areas with other areas according to the replace signal; and the display screen is configured to display the main interface including the other areas according to the third display signal;

wherein the replace signal is one of a page flip signal or a slide signal.

12. The electronic device according to claim 1, wherein the signal source is one of a TV cable, a high-definition player, a jukebox, a set-top box, a DVD/VCD player, a computer, a tablet computer, a U disk, a game console, or a remote server.

13. The electronic device according to claim 1, wherein the display screen displays the main interface without first displaying a menu.

14. The electronic device according to claim 1, wherein the number of areas includes an area for each of the hardware interfaces and the main interface displays all of the areas simultaneously.

15. A method for an electronic device to display resources, comprising:

receiving one or more types of application resources through one or more hardware interfaces each for connecting to a signal source;

classifying and integrating the one or more types of application resources received through the one or more hardware interfaces;

generating a display signal for a main interface including a number of areas arranged according to a predetermined layout, wherein each area is configured to display information regarding a same type of the classified and integrated application resources, different card-shaped areas are configured to display information regarding different types of the classified and integrated application resources, and at least one area corresponds to a hardware interface receiving no application resource; and displaying the main interface according to the display signal.

16. The method according to claim 15, wherein the classifying comprises at least one of:

classifying application resources received through a TV interface into one type of application resources;

classifying application resources received through one or more interfaces of an HDMI interface, an S-Video interface, an AV interface, a VGA interface, a DVI interface, a DP interface and a USB interface into one or more types of application resources, respectively, or classifying the received application resources all into one type of application resources; or classifying application resources received through a network interface into one or more types of application resources based on an application type of the received application resources;

wherein the types of the application resources include at least one type of TV application resources, local playback application resources, online movie and video application resources, game application resources, theme application resources, picture application resources, music application resources, system application resources, customized application resources running through a preset application interface, or third-party application resources running through a preset third-party application interface.

17. The method according to claim 15, wherein the generating of the display signal comprises:

when a first one of the one or more hardware interfaces receives a first application resource from a first signal source, determining information to be displayed in a corresponding one of the areas according to the first application resource, the information to be displayed including at least one of poster pictures, contents, introduction information, or updated information of the first application resource;

when the first one of the one or more hardware interfaces is connected to the first signal source but fails to receive any application resources from the first signal source, determining information to be displayed in the corresponding one of the areas according to the first signal source, the information to be displayed including at least one of a connection status of the first signal source, descriptive information of the first signal source, a device type of the first signal source, a device name of the first signal source, or an operating status of the first signal source; and when the first one of the one or more hardware interfaces is not connected to any signal source, determining information to be displayed in the corresponding one of the areas according to the first one of the hardware interfaces, the information to be displayed including at least one of an interface type or an unconnected status of the first one of the hardware interfaces.

18. The method according to claim 15, wherein the display signal is a first display signal, the method further comprising:

receiving a selection signal selecting one of the areas in the main interface, and generating a second display signal according to the application resource corresponding to the selected area;

switching from displaying the main interface to displaying sub-level contents corresponding to the selected area according to the second display signal, the sub-level contents including contents of the application resources corresponding to the selected card-shaped area, a list of those application resources, and detailed information of a signal source corresponding to the selected area.

19. The method according to claim 18, further comprising:

receiving a return signal corresponding to the sub-level contents, and generating, according to the return signal, a third display signal for the main interface including the number of card-shaped areas arranged according to the predetermined layout; and switching from displaying the sub-level contents to displaying the main interface according to the third display signal.

20. The method according to claim 15, wherein the display signal is a first display signal, the method further comprising:

when the main interface includes more than one page of areas, receiving a replace signal corresponding to the main interface and, according to the replace signal, generating a second display signal for the main interface to replace all or a part of currently areas with other areas;

displaying the main interface including the other areas according to the second display signal, wherein the replace signal is one of a page flip signal or a slide signal.

21. The method according to claim 15, wherein the signal source is one of a TV cable, a high-definition player, a jukebox, a set-top box, a DVD/VCD player, a computer, a tablet computer, a U disk, a game console, or a remote server.

22. A non-transitory computer-readable medium having stored therein instructions that, when executed by a processor of a device, causes the device to perform a method to display resources, the method comprising:

receiving one or more types of application resources through one or more hardware interfaces each for connecting to a signal source;

classifying and integrating the one or more types of application resources received through the one or more hardware interfaces;

generating a display signal for a main interface including a number of areas arranged according to a predetermined layout, wherein each area is configured to display information regarding a same type of the classified and integrated application resources, different card-shaped areas are configured to display information regarding different types of the classified and integrated application resources, and at least one area corresponds to a hardware interface receiving no application resource; and displaying the main interface according to the display signal.

* * * * *